March 17, 1931.  H. S. HALVORSON  1,796,709
CHAIN FASTENER
Filed Sept. 17, 1930
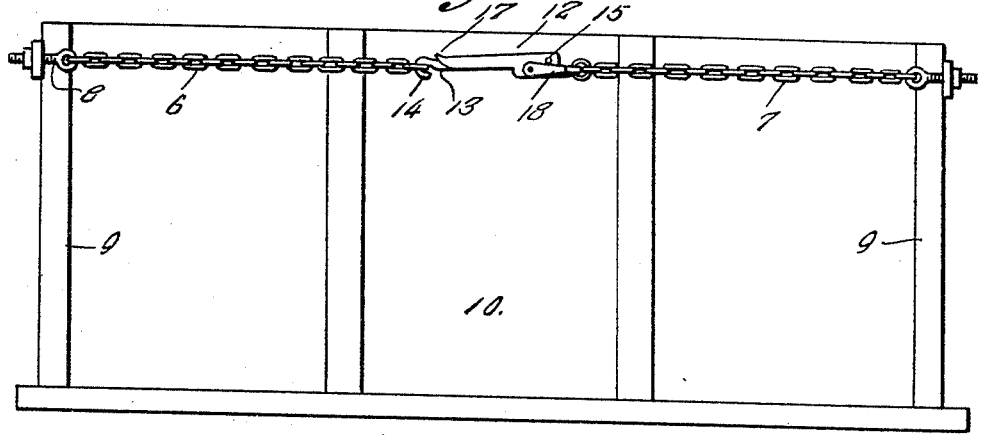
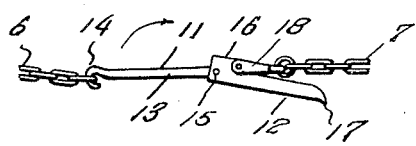
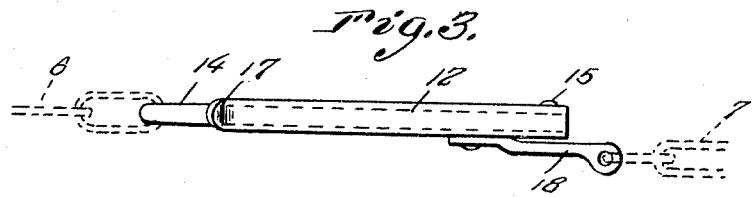
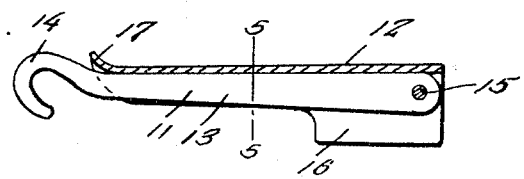
Inventor
H. S. Halvorson
By Clarence A. O'Brien
Attorney Patented Mar. 17, 1931

1,796,709

UNITED STATES PATENT OFFICE

HALVOR S. HALVORSON, OF BUTTERNUT TOWNSHIP, BLUE EARTH COUNTY, MINNESOTA

CHAIN FASTENER

Application filed September 17, 1930. Serial No. 482,574.

This invention relates to an improved chain fastener and has more particular reference to a construction which is especially but not necessarily adapted for use in association with wagons and the like for holding an end gate in closed position.

In carrying the inventive conception into practice I have selected an arrangement of details wherein the details are novel and associated in a practicable and feasible manner for producing a complete fastener which is susceptible of fulfilling the requirements of an article of this class in a highly satisfactory manner.

In the drawings:

Figure 1 is an elevational view of a wagon showing the end gate, the chains having a fastener associated therewith.

Figure 2 is a detail view of the chain fastener with the fastener swung to an open position.

Figure 3 is a similar view with the fastener closed.

Figure 4 is a longitudinal sectional view through the structure seen in Figure 3.

Figure 5 is a cross section on the line 5—5 of Figure 4.

As seen in Figure 2 the complemental chains are denoted or distinguished by the numerals 6 and 7. These chains are suitably fastened at their outer ends as indicated at 8 on the side walls 9 of the wagon body. The end gate is indicated at 10. The adjustable fastenings 8 are to facilitate the taking up of slack in the chains.

The fastener comprises primarily two parts namely a link indicated at 11 and the lever 12. The link comprises a shank 13 having a hook at one end 14 to releasably engage in the adjacent end eye of the chain 6. The lever is in the form of a metal sheath which is pivoted as at 15. The sheath portion is indicated at 16 and it is obvious that it is designed to form a receptacle for reception of the shank 13 as shown in Figure 5. This channel shaped sheath as well as the shank is of corresponding cross section to permit the parts to be nested together as shown in Figure 5. The numeral 17 duly designates a lip or finger grip whereas numeral 18 designates a lug carried located adjacent the pivotal connection and designed for permanent connection with the end ring or link on the chain 7. In order to disconnect the link 11 it is necesary to swing the lever 12 into the position shown in Figure 2 whereupon sufficient slack is obtained to permit the hook 14 to be disengaged. Upon swinging the lever up and over the links to take the position shown in Figures 3 and 4 it is obvious that automatic take up action tightens the chains to provide a dependable fastener for securing the ends of the chain together.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details coming within the field of invention claimed may be resorted to in actual practice, if desired.

I claim:

In a chain assembly and fastener structure of the class described, a pair of substantially duplicate companion chains, means for adjustably anchoring the outer ends of said chains on the body of a wagon, a substantially channel-shaped chain tightening and slacking lever, said lever functioning as a sheath, a link pivotally mounted at one end in said sheath and extending beyond the opposite end of the sheath, the last named end of said sheath having its bight portion bent laterally in a curvate manner to form a finger grip, the adjacent end portion of said link extending beyond the said finger grip and terminating in a hook detachably engageable with the adjacent end portion of one of said chains, and a lug rigidly secured to said lever at a point adjacent the pivotal attachment of said link, said lug extending beyond the adjacent ends of the link and lever and being permanently connected with the adjacent end portion of the remaining chain.

In testimony whereof I affix my signature.

HALVOR S. HALVORSON.